US011241780B2

(12) United States Patent
Kamijo

(10) Patent No.: US 11,241,780 B2
(45) Date of Patent: Feb. 8, 2022

(54) ELECTRIC TOOL

(71) Applicant: Maxell Izumi Co., Ltd., Matsumoto (JP)

(72) Inventor: Keiichiro Kamijo, Matsumoto (JP)

(73) Assignee: Maxell Izumi Co., Ltd., Matsumoto (JP)

( * ) Notice: Subject to any disclaimer, the term of this patent is extended or adjusted under 35 U.S.C. 154(b) by 87 days.

(21) Appl. No.: 16/753,890

(22) PCT Filed: Dec. 7, 2017

(86) PCT No.: PCT/JP2017/044063
§ 371 (c)(1),
(2) Date: Apr. 6, 2020

(87) PCT Pub. No.: WO2019/111390
PCT Pub. Date: Jun. 13, 2019

(65) Prior Publication Data
US 2020/0254600 A1 Aug. 13, 2020

(51) Int. Cl.
*B25F 5/00* (2006.01)
*B25F 5/02* (2006.01)
(Continued)

(52) U.S. Cl.
CPC ............... *B25F 5/005* (2013.01); *B25F 5/02* (2013.01); *H01R 43/0427* (2013.01); *H01R 43/0428* (2013.01); *B23D 29/002* (2013.01)

(58) Field of Classification Search
CPC ... B25F 5/005; B25F 5/02; B25F 5/00; H01R 43/0427; H01R 43/0428; B23D 29/002;
(Continued)

(56) References Cited

U.S. PATENT DOCUMENTS 4,226,110 A  10/1980 Suganuma
4,244,275 A * 1/1981 Smilges .................. F15B 13/01
                                                   137/106
(Continued)

FOREIGN PATENT DOCUMENTS

JP        S5439698 U     3/1979
JP        S6080877 U     6/1985
(Continued)

*Primary Examiner* — Thomas M Wittenschlaeger
*Assistant Examiner* — Katie L Gerth
(74) *Attorney, Agent, or Firm* — Muncy, Geissler, Olds & Lowe, P.C.

(57) ABSTRACT

An electric tool (1) includes piston (36) reciprocably housed in cylinder (34) provided in main body portion (10) and be pushed by a pressure of fluid; tool head (14) coupled to a distal end of the main body portion and performing a predetermined operation by being pushed by the piston; return channel (40) communicating from the cylinder to a fluid tank to allow the fluid to flow therethrough; pressure regulating valve (44) disposed in operational flow channel (42) branching from the return channel and taking an open position when the pressure of the fluid in the return channel becomes equal to or higher than a predetermined value; operating pin (46) disposed in the operational flow channel and pushed by the pressure of the fluid flowing therein; and return valve (48) disposed in the return channel and taking an open position by being pushed by the operating pin.

7 Claims, 6 Drawing Sheets

(51) Int. Cl.
*H01R 43/042* (2006.01)
*B23D 29/00* (2006.01)

(58) Field of Classification Search
CPC ....... B23D 15/14; B25B 27/146; B25B 27/10; B25B 25/00
See application file for complete search history.

(56) References Cited

U.S. PATENT DOCUMENTS

| | | | |
|---|---|---|---|
| 4,936,032 A | | 6/1990 | Marcon et al. |
| 5,235,896 A | * | 8/1993 | Huber .................... F15B 13/01 91/420 |
| 10,312,653 B2 | * | 6/2019 | Ballard .............. H01R 43/0427 |

FOREIGN PATENT DOCUMENTS

| | | |
|---|---|---|
| JP | H02-31085 A | 2/1990 |
| JP | H03265770 A | 11/1991 |
| JP | H4-26699 U | 3/1992 |
| JP | H078669 U | 2/1995 |
| JP | 2000117654 A * | 4/2000 |
| JP | 2000117654 A | 4/2000 |
| JP | 2013066897 A | 4/2013 |

* cited by examiner

ELECTRIC TOOL

TECHNICAL FIELD

The present invention relates to an electric tool and more specifically, to an electric tool which includes a piston reciprocably housed in a cylinder provided in a main body portion and configured to be pushed by a pressure of a fluid; and a tool head coupled to a distal end of the main body portion and configured to perform a predetermined operation by being pushed by the piston, and is configured to be driven by an electric motor.

BACKGROUND ART

In the related art, electric tools configured to perform a predetermined operation by being driven by an electric motor, such as a crimping tool configured to fix crimp-type terminals to wires or cables, and a cutting tool configured to cut wires or cables, are known.

As an example, an electric tool disclosed in PTL 1 is proposed. The electric tool is of a cordless type provided with a detachable battery in a main body portion, and a hydraulic pump is driven by an electric motor while an operator pushes a start switch knob. The hydraulic pressure pushes the piston so that an operation of closing a distal end portion of a mouth ring in a tool head is achieved. As an example, by using the tool head for crimping, the tool can be used as a crimping tool for fixing the crimp-type terminals to wires or cables. Alternatively, by using a tool head for cutting, the tool can be used as a cutting tool for cutting wires and cables.

CITATION LISTS

Patent Literature

PTL 1: JP-A-2013-066897

SUMMARY OF INVENTION

Technical Problem

The electric tool of the related art as that disclosed in PTL 1 is configured to operate a return lever to bring a piston to its original position when the crimping or cutting operation is completed to be ready for the next operation. Therefore, an operator is required to release his fingers from a start switch knob once and then push the return lever again. Therefore, an increase in trouble and time due to an additional process step has been presenting a problem.

As a solution thereto, there has been developed an electric tool having an automatic retraction function, which brings the piston to its starting position automatically when the operation is completed. However, there are problems that when the automatic retraction function is not necessary, the function in question cannot be released and that the automatic retraction function cannot be stopped halfway during the operation. If such a structure that a return valve for returning the piston can be electrically operated from the outside is employed, releasing the automatic retraction function or stopping the automatic retraction function halfway is enabled. However, a solenoid, a motor, or the like for electrically operating the return valve is required. Therefore, problems such as complication in structure, increase in weight, or increase in manufacturing cost may arise. Alternatively, a method of employing a structure in which the return valve is closed when the start switch knob is pushed, and the return valve is opened when releasing the start switch knob is also conceivable. However, another problem that a temporary holding cannot be made during the operation may arise.

In view of the above issues, it is an object of the present invention to provide an electric tool configured to achieve an automatic retraction function for automatically returning a piston to a starting position when an operation is completed and to allow easy attachment of a mechanism configured to release the automatic retraction function or stop the automatic retraction function halfway, with a simple structure using a hydraulic mechanism.

Solution to Problem

As an embodiment, the following means for solving the above issues are described below.

The disclosed electric tool is an electric tool which includes a piston reciprocably housed in a cylinder provided in a main body portion and configured to be pushed by a pressure of a fluid; and a tool head coupled to a distal end of the main body portion and configured to perform a predetermined operation by being pushed by the piston, and is configured to be driven by an electric motor, the electric tool including: a return channel communicating from the cylinder to a fluid tank configured to store the fluid to allow the fluid to flow therethrough; a pressure regulating valve disposed in an operational flow channel for an operation branching from the return channel and configured to take an open position when a pressure of the fluid in the return channel becomes equal to or higher than a predetermined value; an operating pin disposed in the operational flow channel and configured to be pushed by a pressure of the fluid flowing therein; and a return valve disposed in the return channel and configured to take an open position by being pushed by the operating pin.

Advantageous Effects of Invention

According to the present invention, without providing a solenoid, a motor or the like for electrically operating a return valve, an automatic retraction function in which a piston is automatically returned to its starting position when a predetermined operation is completed is achieved with a simple mechanical structure using a hydraulic mechanism. In addition, easy attachment of a mechanism for performing release or halfway stop of the automatic retraction function is achieved.

DESCRIPTION OF EMBODIMENTS

Figure 1:
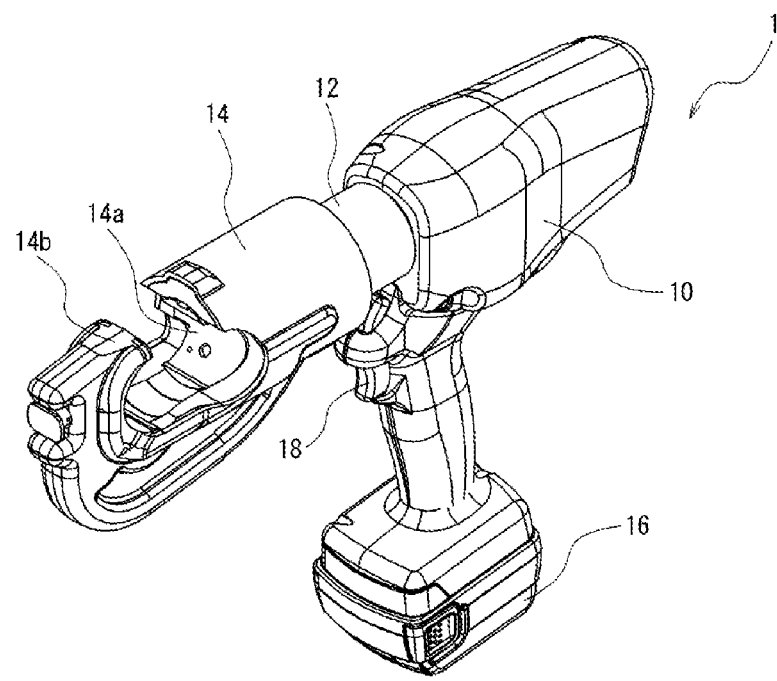
FIG. 1 is a perspective view (schematic view) illustrating an example of an electric tool according to an embodiment of the present invention.
Figure 2:
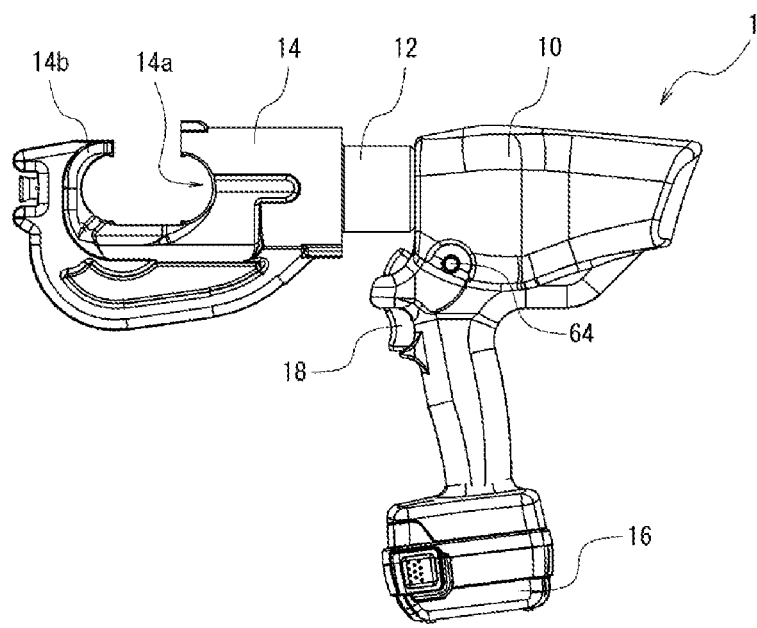
FIG. 2 is a front view (schematic view) of the electric tool illustrated in FIG. 1.
Figure 3:
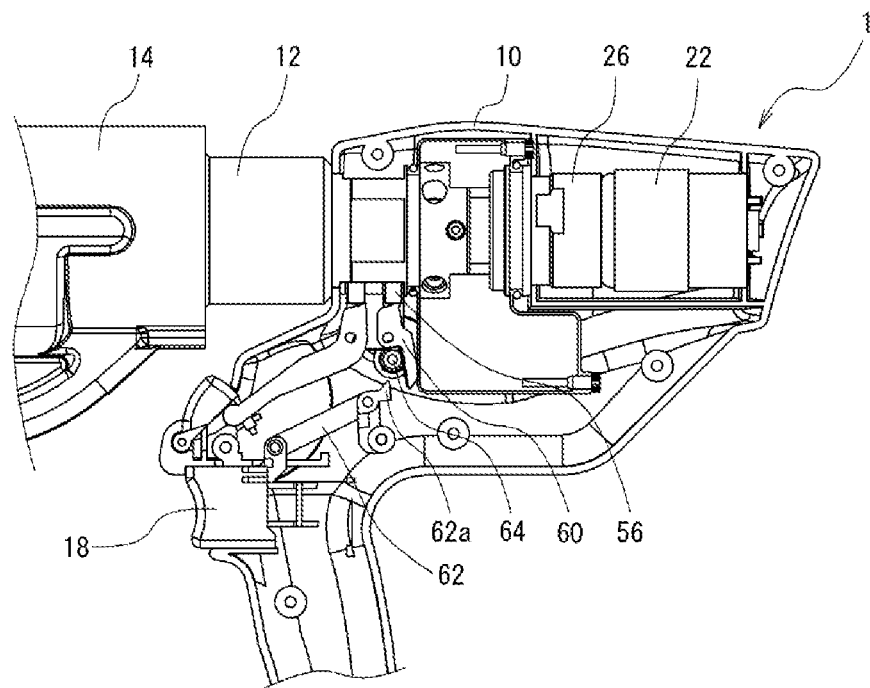
FIG. 3 is a schematic view illustrating an example of an internal mechanism of the electric tool illustrated in FIG. 1.
Figure 4:
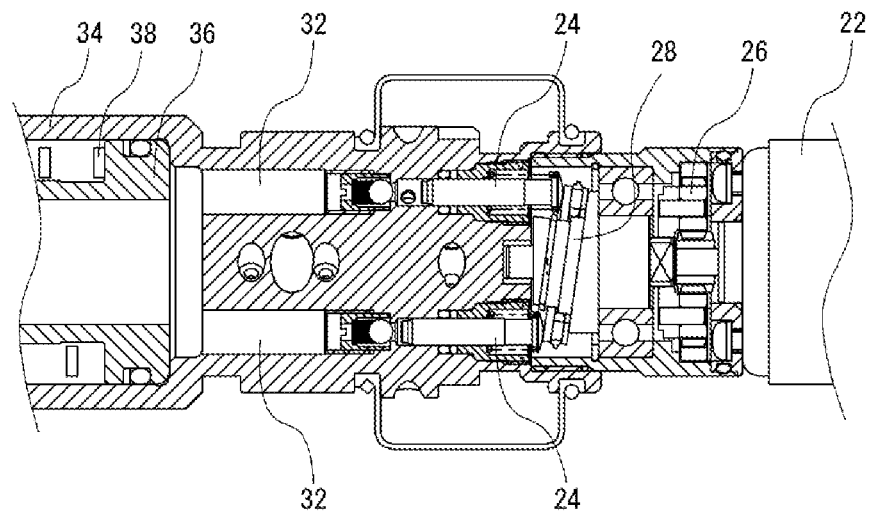
FIG. 4 is an enlarged view (schematic view) illustrating mainly a portion relating to a pushing mechanism of a piston of the electric tool illustrated in FIG. 1.

Referring to the drawings, an embodiment of the present invention will be described below in detail. FIG. 1 is a perspective view (schematic view) illustrating an example of an electric tool 1, and FIG. 2 is a front view (schematic view). FIG. 3 is a schematic view illustrating an internal mechanism of the electric tool 1. FIG. 4 is an enlarged view (schematic view) illustrating mainly a portion relating to a pushing mechanism of a piston 36 of the electric tool 1. In all drawings used in describing the embodiments, the same reference numerals will be given to members having the same function, and repeated description thereof will be omitted in some cases.

The electric tool 1 according to the present embodiment is of a cordless type electric tool which allows an operator to operate by gripping with one hand as illustrated in FIG. 1 to FIG. 4. A tool head at a distal end portion is configured to be replaceable. For example, by providing a tool head 14 for crimping at the distal end portion thereof, the electric tool can be used as a crimping tool configured to pressure-bond cables or the like and crimp-type terminals by crimping. In contrast, by providing a tool head (not illustrated) having a cutter for cutting at the distal end portion thereof, the electric tool can also be used as a cutting tool for cutting cables or the like. Hereinafter, a case where the electric tool 1 of the present embodiment is the crimping tool will be described as an example.

The electric tool 1 includes a gun-shaped main body portion 10 where the operator grips, a mounting portion 12 provided at a distal end portion thereof, the tool head 14 mounted on the mounting portion 12 so as to be replaceable, and a detachable and attachable rechargeable battery 16. In an interior of the main body portion 10, an electric motor 22 driven by a power source of the battery 16, a fluid pump (for example, hydraulic pump) 24 driven by the electric motor 22 to pressurize the fluid (for example, a working fluid), and a controller (not illustrated) configured to perform control such as driving are provided.

The electric tool 1 having the configuration as described above is configured to perform a predetermined operation by the tool head 14 by a pressure of the fluid pressurized by the fluid pump 24. A series of operations will be described specifically below with an example of a case where the tool head 14 performs a crimping operation.

First, the operator presses a start switch knob 18 of the main body portion 10 to drive the electric motor 22. At this time, a rotational force is transmitted from the electric motor 22 via a speed reduction mechanism 26 and is converted into a drive force of the fluid pump 24 of a direct-acting system by a swash plate cam 28. The fluid pressurized by the fluid pump 24 flows through a discharge channel 32 and flows into a cylinder 34 provided in the main body portion 10. Under the pressure of this fluid, the piston 36, which is reciprocably housed in the cylinder 34, is pushed in one direction (toward the distal end portion of the main body portion 10). An operating arm 14a of the tool head 14 is coupled to a distal end portion of the piston 36 and is pushed toward the distal end portion of the main body portion 10 together with the piston 36. Therefore, by storing the cable or the like and the crimp-type terminal between a fixed arm 14b and the operating arm 14a of the tool head 14, an operation of crimping the cable and the crimp-type terminal is achieved.

In the configuration of the present embodiment, the power source is supplied from the battery 16 and the electric motor 22 is driven only while the starting switch knob 18 provided on the main body portion 10 is being pressed. However, the configuration of the present embodiment is not limited thereto, and such a configuration is also applicable in which driving of the electric motor 22 is started when the start switch knob 18 is pressed and driving of the electric motor 22 is stopped when the start switch knob 18 is pressed again for the next time.

Figure 5:
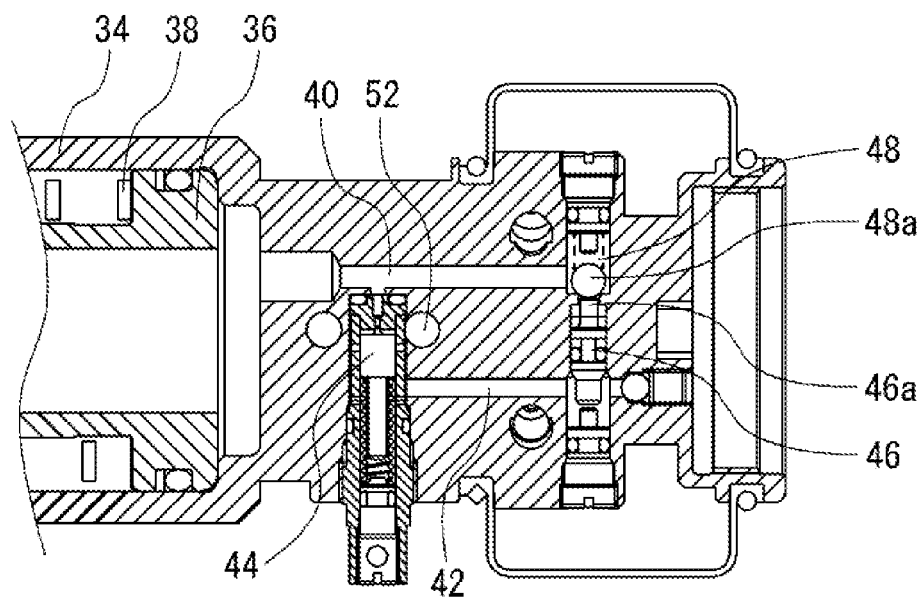
FIG. 5 is an enlarged view (schematic view) illustrating mainly a portion relating to a mechanism configured to perform an automatic retraction function of the piston in the electric tool illustrated in FIG. 1.
Figure 6A:
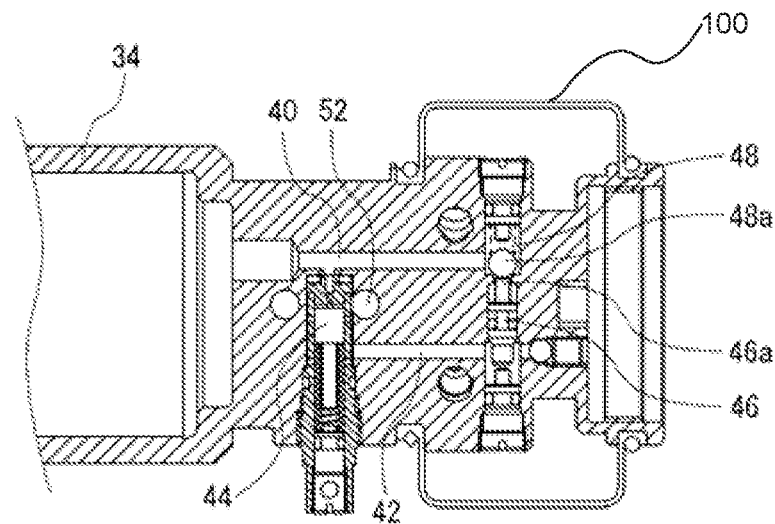
FIGS. 6A to 6C are explanatory drawings illustrating the automatic retraction function of the piston of the electric tool illustrated in FIG. 1.
Figure 6B:
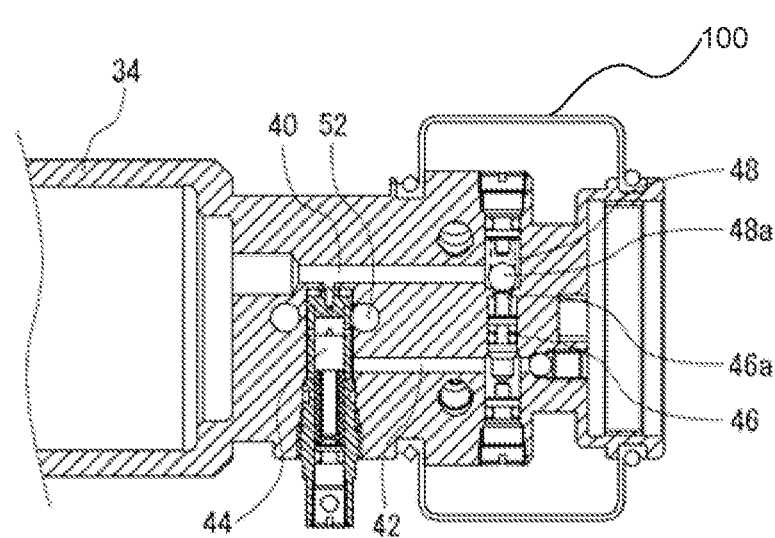
Figure 6C:
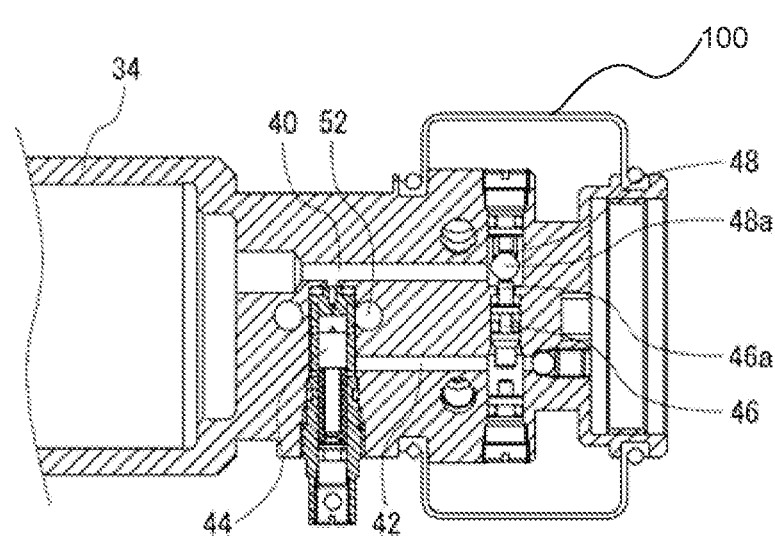

The electric tool 1 according to the present embodiment is also provided with an automatic retraction function configured to return the piston 36 automatically to a starting position when the operation is completed. The configuration for achieving the automatic retraction function will now be described in detail. FIG. 5 is an enlarged view (cross-sectional view) in a plan view illustrating mainly a part relating to the mechanism that performs the automatic retraction function, and FIGS. 6A to 6C are explanatory drawings illustrating the automatic retraction function.

As illustrated in FIG. 5, a return channel 40 communicating the cylinder 34 to a fluid tank 100 configured to store the fluid to allow the fluid to flow therethrough is provided. Here, an operational flow channel 42 branching off from the return channel 40 is provided, and a pressure regulating valve 44 configured to open and close the operational flow channel 42 is provided in the middle of the operational flow channel 42. The pressure regulating valve 44 serves to take an open position to open the operational flow channel 42 when the pressure of the fluid in the return channel 40 becomes equal to or higher than a predetermined value.

In this configuration, when a predetermined operation (for example, a crimping operation) by the tool head 14 is completed, fluid pressurized by the fluid pump 24 flows continuously into the cylinder 34 in a state in which the piston 36 is stopped pushing, and the pressure of the fluid in the return channel 40 communicating with the inside of the cylinder 34 and in the cylinder 34 becomes equal to or greater than a predetermined value. Therefore, the pressure regulating valve 44 comes to the open position to open the operational flow channel 42, so that an operation of the pressurized fluid flowing into the operational flow channel 42 from the return channel 40 is achieved. In general, the operator can confirm that the predetermined operation by the tool head 14 is completed by a sound generated when the pressure regulating valve 44 takes the open position, so the operator stops the operation of pushing the start switch knob 18.

Figure 8:
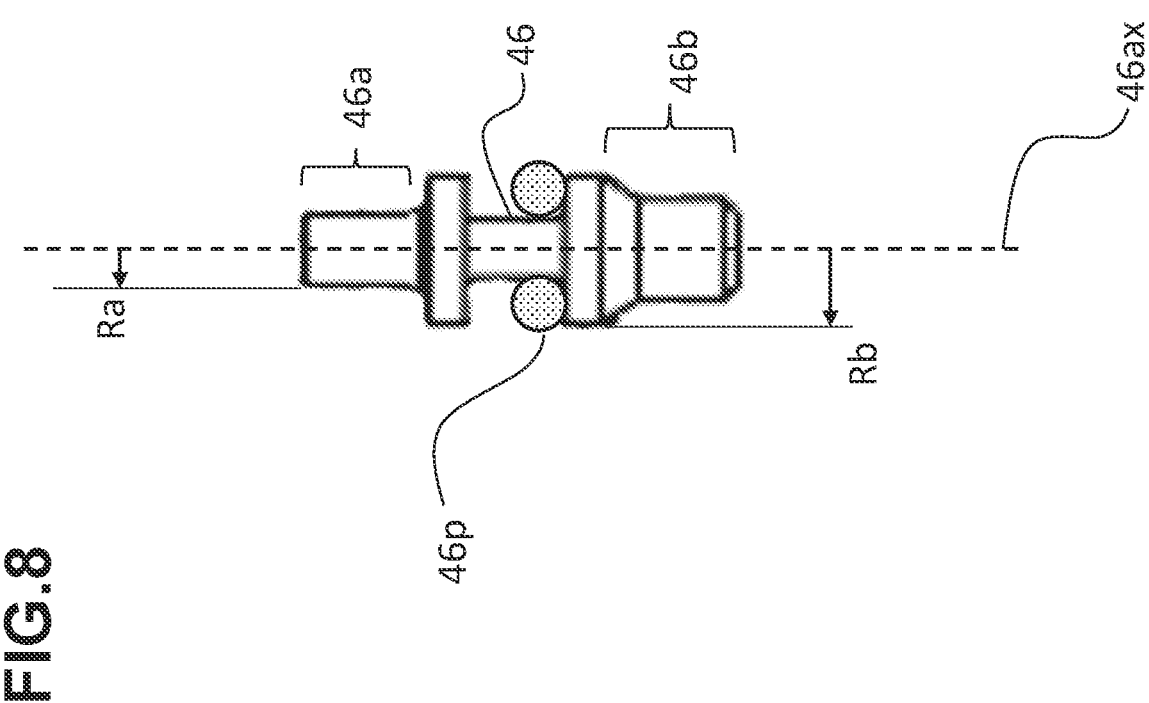
FIG. 8 is an enlarged view illustrating an operating pin 46.

Next, the operational flow channel 42 includes an operating pin 46 that is reciprocably provided within the operational flow channel 42 in a state in which a distal end portion 46a protrudes outside the operational flow channel 42 at a position downstream from the pressure regulating valve 44 (a position far from a branch portion branched from the return channel 40), and a proximal end portion 46b is present inside the operational flow channel. The operating pin 46 extends in an operation axis 46ax, the distal and proximal end portions are arranged at the opposite ends thereof. An O-ring 46p is placed in the middle section of the pin to seal the section. A radius of the distal end portion 46a is denoted with Ra. A radius of the proximal end portion 46b is denoted with Rb, see FIG. 8. It is understood that an area amount of the proximal end portion is greater than an area amount of the distal end portion because the radius Rb is greater than the radius Ra. These area amounts are determined in a view seen from a direction along which the operation axis extends. The operating pin 46 is normally biased in such a direction that the distal end portion 46a is directed toward the inside of the operational flow channel 42 (namely, in the direction away from a return valve 48 described later) by a biasing member, and when the operational flow channel 42 is opened and pressurized fluid flows into the operational flow channel 42 from the return channel 40, the operating pin 46 (more specifically, the proximal end portion 46b of the pin) is pushed by the pressure of the fluid to be directed toward the outside of the operational flow channel 42 (namely, in the direction toward a return valve 48 described later).

In this configuration, such an operation is achieved that when the pressure regulating valve 44 takes the open position to open the operational flow channel 42, the pressure of the fluid flowing into the operational flow channel 42 from the return channel 40 pushes the distal end portion 46a of the operating pin 46 to be directed toward the outside of the operational flow channel 42.

Next, a return valve 48 for opening and closing the return channel 40 is provided in the return channel 40 at a position downstream of a branch portion branched from the operational flow channel 42 (a position far from the branch portion). The return valve 48 has a spherical valve element 48a, and is configured to be biased normally in one direction in which the valve element 48a takes a closed position (in this case, the direction toward the inside of the operational flow channel 42) by the biasing member and take an open position to open the return channel 40 when the valve element 48a is pushed in an opposite direction (in this case, the direction toward the outside of the operational flow channel 42) by the distal end portion 46a of the operating pin 46.

In this configuration, when the pressure of the fluid flowing into the operational flow channel 42 from the return channel 40 causes the distal end portion 46a of the operating pin 46 to be pushed to be directed toward the outside of the operational flow channel 42, the return valve 48 takes the open position to open the return channel 40. Therefore, an operation of allowing the fluid in the cylinder 34 to flow out to the fluid tank through the return channel 40 is achieved. At this time, since an operation of pushing the start switch knob 18 is stopped, an operation of pushing the piston 36 in one direction (the direction toward the distal end portion of the main body portion 10) is not performed. Therefore, since the fluid in the cylinder 34 flows out to the fluid tank, the pressure of the fluid in the cylinder 34 decreases, so that the biasing force of a biasing member 38 provided in the cylinder 34 exceeds the pressure, and the piston 36 is pushed in the opposite direction (the direction away from the distal end portion of the main body portion 10). That is, a retraction function for returning the piston 36 to the starting position is obtained. Incidentally, when the operation of pushing the start switch knob 18 is continued when the operation is completed, the fluid flows into the return channel 40 from the inside of the cylinder 34 while the fluid flows into the cylinder 34 from the discharge channel 32, so that the piston 36 does not move in either direction.

As described above, when the operator presses the start switch knob 18 of the main body portion 10 to operate the tool head 14 and performs a predetermined operation (such as crimping), and the operation is completed, the movement of the movable portion (for example, the fixed arm 14b) of the tool head 14 stops (see FIG. 6A). At this time, since the piston 36 is also stopped, the pressure of the fluid in the cylinder 34 and the return channel 40 communicating with the inside of the cylinder 34 becomes equal to or higher than a predetermined value. Accordingly, the pressure regulating valve 44 comes to the open position to open the operational flow channel 42, so that the pressurized fluid flows into the operational flow channel 42 from the return channel 40 (see FIG. 6B). As a result, the distal end portion 46a of the operating pin 46 is pushed toward the outside of the operational flow channel 42 by the pressure of the fluid flowing into the operational flow channel 42, so that the return valve 48 takes the open position (see FIG. 6C). Therefore, the return channel 40 opens and the fluid in the cylinder 34 flows into the fluid tank through the return channel 40, so that the pressure of the fluid in the cylinder 34 is reduced and the piston 36 is returned to the starting position by the biasing force of the biasing member 38. That is, the automatic retraction function is achieved in which the piston 36 is automatically returned to the starting position in accordance with the end of the operation.

In the configuration described above, the automatic retraction function of the piston 36 is achieved by a simple mechanical structure, specifically a simple hydraulic mechanism using an operational flow channel, an open/close valve, or the like. Therefore, since there is no need to provide a solenoid, a motor, or the like for operating the electrically return valve, it is possible to solve problems such as complication of the structure, increase in weight, increase in manufacturing cost, and the like.

Figure 7:
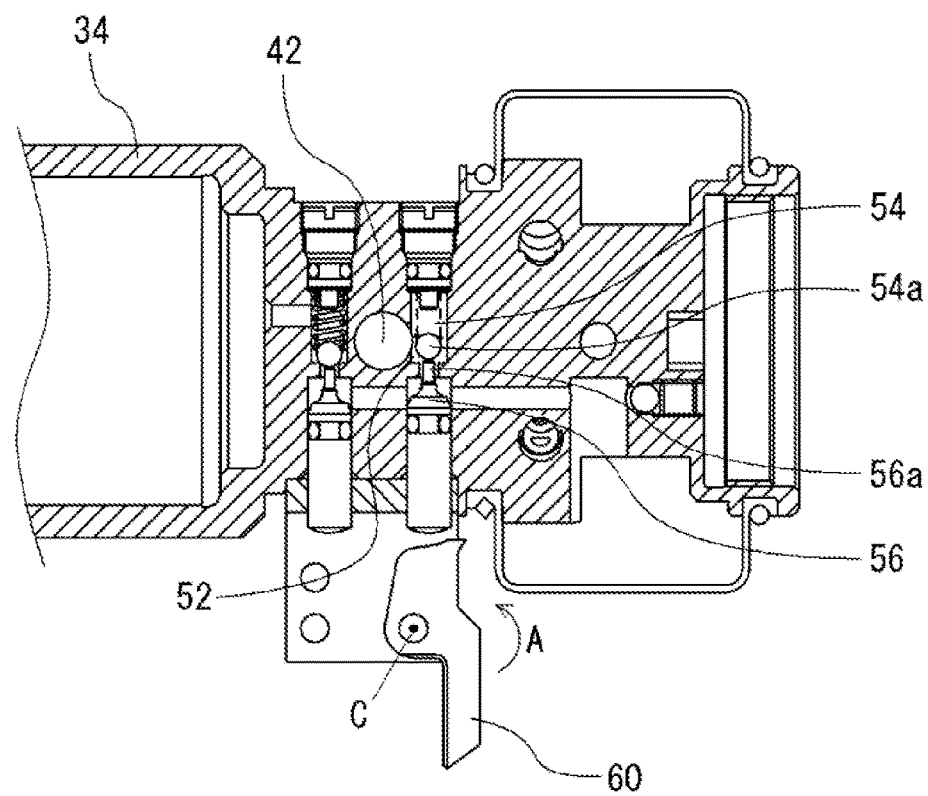
FIG. 7 is an enlarged view (schematic view) illustrating mainly a portion relating to a mechanism configured to release the automatic retraction function of the piston of the electric tool illustrated in FIG. 1 and stop the automatic retraction function halfway.

Further, since the automatic retraction function is realized by using a simple hydraulic mechanism, the mechanism for releasing the automatic retracting function and the mechanism for stopping the automatic retracting function halfway can be easily added. These mechanisms will now be described in detail. FIG. 7 is an enlarged view (cross-sectional view) from the front illustrating mainly a portion relating to a mechanism configured to release the automatic retraction function and stop the automatic retraction function halfway.

As illustrated in FIG. 7, a release channel 52 branched off from the operational flow channel 42 is provided. The branch portion is provided at a position between a position to dispose the pressure regulating valve 44 and a position to dispose the operating pin 46. Here, a pressure release valve 54 configured to open and close the release channel 52 is provided in the middle of the release channel 52. The pressure release valve 54 has a spherical valve element 54a, is configured to be biased normally in one direction in which the valve element 54a takes a closed position by the biasing member, and take an open position when the valve element 54a is pushed in the opposite direction by a distal end portion 56a of an open pin 56, thereby opening the release channel 52.

In this configuration, in a case where the pressure release valve 54 takes the open position to open the release channel 52 when the above-described pressure regulating valve 44 takes the open position to open the operational flow channel 42 and allow the fluid to flow into the operational flow channel 42 from the return channel 40, the fluid flows out from the operational flow channel 42 to the release channel 52, so that the pressure in the operational flow channel 42 is not increased and an operation of pushing the operating pin 46 is not performed. Therefore, since the return valve 48 does not take the open position and the return channel 40 does not open, the retraction function of returning the above-described piston 36 to the starting position does not work. In contrast, in a case where the pressure release valve 54 takes the closed position and the release channel 52 is not opened when the fluid flows into the operational flow channel 42 from the return channel 40, the retraction function of returning the piston 36 to the starting position works.

In the present embodiment, the opening/closing operation of the release channel 52 (here, an operation to take an open position), that is, a cam 60 configured to perform the operation (push) of the open pin 56 to push the pressure release valve 54 to the open position is provided. The cam 60 is rotatably disposed and is configured to be biased normally toward one direction, and achieve an operation to push the open pin 56 by being turned to a predetermined position in the opposite direction (in the direction indicated by arrow A), that is, an operation to bring the pressure release valve 54 to the open position.

Here, the following two configurations are provided as an operating portion for moving (turning) the cam 60 to the predetermined position.

As a first configuration of the operating portion described above, a link portion 62 coupled to the start switch knob 18 and configured to convert the movement of the start switch knob 18 into the turning of the cam 60 is provided. Accordingly, in a state in which the predetermined operation by the tool head 14 is completed and the automatic retraction function described above is started, and the operator stops the pressing of the start switch knob 18, the operator pushes the start switch knob 18 again (it is not necessary to keep pushing, one push is sufficient), so that an operation of causing a distal end portion 62a of the link portion 62 coupled to the start switch knob 18 for moving (turning) the cam 60 to a predetermined position is achieved. Therefore, the pressure release valve 54 takes the open position, so that the automatic retraction function of the piston 36 can be stopped halfway during the operation. In this manner, a halfway stop mechanism of stopping the automatic retraction function halfway can be achieved by the addition of a very simple structure.

A second configuration of the operating portion described above includes a lever portion 64, which comes in contact with the cam 60 with two different working dimensions, large and small. As an example, a cylindrical member, which is disposed so as to be movable in a direction parallel to a rotation axis C of the cam 60 and which can be brought into contact with the cam 60 with two working radii, is used as the lever portion 64. Accordingly, a portion of the lever portion 64 having a large working dimension is brought into contact with the cam 60, so that an operation of moving (turning) the cam 60 is achieved. Note that a portion of the lever portion 64 having a small working dimension may be configured not to come into contact with the cam 60 or may be brought into contact with the cam 60 to a degree not to be moved (turned) to a predetermined position.

In this configuration prior to the start of the operation, that is, by moving the lever portion 64 to the one position prior to the pushing start switch knob 18 into a state of bringing the portion of the small working dimension out of contact with the cam 60 (or, into contact but not turning to the predetermined position), the cum 60 is not moved (turned) to the predetermined position, so that a state in which the automatic retraction function works is achieved. In contrast, by moving the lever portion 64 to the other position prior to pushing the start switch knob 18 to a state in which the portion of a large working dimension comes into contact with the cam 60, an operation of moving (turning) the cam 60 to the predetermined position is achieved. Therefore, the pressure release valve 54 takes the open position, so that the automatic retraction function of the piston 36 can be released. In this manner, the mechanism of releasing the automatic retraction function can be achieved by adding a very simple structure.

As described above, according to the electric tool of the present invention, without providing a solenoid, a motor, or the like for electrically operating a return valve, and with a simple mechanical structure using a hydraulic mechanism, an automatic retraction function in which the piston is automatically returned to its starting position when a predetermined operation is completed is achieved. In addition, easy attachment of a mechanism for performing release or halfway stop of the automatic retraction function is achieved.

The present invention is not limited to the examples described above and may be modified variously without departing the scope of the present invention. While the above description is conducted based on the crimping tool, in particular, as an example of the electric tool of the present invention, the electric tool of the present invention is not limited to the crimping tool, and can be also preferably applied to a cutting tool or the like.

What is claimed is:

1. An electric tool, which includes a piston reciprocably housed in a cylinder provided in a main body portion and configured to be pushed by a pressure of a fluid; and a tool head coupled to a distal end of the main body portion and configured to perform a predetermined operation by being pushed by the piston, and is configured to be driven by an electric motor, the electric tool comprising:
    a return channel communicating from the cylinder to a fluid tank configured to store the fluid to allow the fluid to flow therethrough;
    a pressure regulating valve disposed in an operational flow channel for an operation branching from the return channel at a branch portion and configured to take an open position when a pressure of the fluid in the return channel becomes equal to or higher than a predetermined value;
    an operating pin disposed in the operational flow channel and configured to extend along an operation axis and to be pushed by the pressure of the fluid flowing in the operational flow channel; and
    a return valve disposed at a downstream from the branch portion in the return channel and configured to contact to the operating pin and to take an open position by being pushed by the operating pin, wherein
    the operating pin has two end portions at opposing ends thereof in the operation axis, which are a distal end portion and a proximal end portion, wherein the distal end portion is defined as a portion contacting the return valve and facing the return channel, and the proximal end portion is defined as the other of the end portions facing the operational flow channel,
    the proximal end portion has a proximal area and the distal end portion has a distal area, wherein amounts of these areas are determined in a view seen from an extending direction of the operation pin, and the amount of the proximal area is greater than the amount of the distal area.

2. The electric tool according to claim 1, further comprising:
    a release channel that branches off the operational flow channel at a position between the pressure regulating valve and the operating pin; and a pressure release valve configured to open and close the release channel.

3. The electric tool according to claim 2, further comprising: a cam configured to open and close the pressure release valve.

4. The electric tool according to claim 3, wherein an operating portion configured to operate the cam comprises a link portion coupled to a start switch knob.

5. The electric tool according to claim 4, wherein an operating portion configured to operate the cam comprises a lever portion that is configured to swing between a first position and a second position, and to have the cam with two working dimensions such that,
  when being at the first position, the lever portion contacts with the cam, and
  when being at the second position, the lever portion is separated from the cam.

6. The electric tool according to claim 3, wherein an operating portion configured to operate the cam comprises a lever portion that is configured to swing between a first position and a second position, and to have two working dimensions such that,
  when being at the first position, the lever portion contacts with the cam, and
  when being at the second position, the lever portion is separated from the cam.

7. The electric tool according to claim 1, wherein
defining that the piston in the cylinder is pushed by the pressure of the fluid in a forward direction, the piston is configured to be always pushed in a backward direction, which is opposite to the forward direction, by a first bias force,
the operating pin is configured to reciprocate along the operation axis between a project position and a regress position wherein, in the project position, the operating pin is positioned most toward the return channel, in the regress position, the operating pin is positioned most toward the operational flow channel, and the operating pin is always pressed toward the operational flow channel by a second bias force,
  only the distal end portion being exposed to the fluid in the return channel,
  only the proximal end portion being exposed to the fluid in the operational fluid channel,
the return valve is configured to always take a close position by a third bias force while the operating pin is at the regress position, wherein,
  when the return valve is at the close position, the fluid in the return channel is blocked by the return valve such that the pressure of the fluid increases while the tool head performs the predetermined operation, and
  when the return valve turns to the open position by the operating pin, the fluid in the return channel flows passing though the return value toward the fluid tank,
when the pressure of the fluid in the return channel reaches the predetermined value,
  the pressure regulating valve turns to the open position, and
  a predetermined pressure corresponding to the predetermined value is applied to the distal end portion in the return channel and the proximal end portion in the operational flow channel,
  a difference of pressing forces is created between the distal end portion and the proximal end portion in correspondence with an amount difference of these areas between the proximal area and the distal area such that the operating pin is moved toward the project position and pushes the return valve to the open position, allowing the fluid in the return channel to flow into the fluid tank, and
when the pressure of the fluid in the return channel becomes below the predetermined pressure by the return valve taking the open position, the pressure regulating valve turns to the close position, maintaining the pressure of the fluid in the operational flow channel such that the operating pin keeps pushing the return valve, allowing the return valve to maintain the open position.

* * * * *